(12) United States Patent
Messineo et al.

(10) Patent No.: US 9,138,679 B2
(45) Date of Patent: Sep. 22, 2015

(54) SYSTEMS AND METHODS TO PREVENT BACK-FLASH IN AN ABATEMENT SYSTEM

(71) Applicant: Airgard, Inc., San Jose, CA (US)

(72) Inventors: Daniel L. Messineo, Fremont, CA (US); Robert T. LoBianco, Sunnyvale, CA (US); Mark W. Johnsgard, San Jose, CA (US)

(73) Assignee: Airgard, Inc., San Jose, CA (US)

( * ) Notice: Subject to any disclaimer, the term of this patent is extended or adjusted under 35 U.S.C. 154(b) by 0 days.

(21) Appl. No.: 14/269,967

(22) Filed: May 5, 2014

(65) Prior Publication Data

US 2014/0308187 A1    Oct. 16, 2014

Related U.S. Application Data

(63) Continuation of application No. 14/213,973, filed on Mar. 14, 2014, now Pat. No. 9,023,303.

(60) Provisional application No. 61/812,206, filed on Apr. 15, 2013.

(51) Int. Cl.
| | |
|---|---|
| *F23D 14/82* | (2006.01) |
| *B01D 53/38* | (2006.01) |
| *F23G 7/06* | (2006.01) |
| *B01D 53/18* | (2006.01) |
| *B01D 53/78* | (2006.01) |
| *F23G 5/50* | (2006.01) |

(52) U.S. Cl.
CPC ............. *B01D 53/38* (2013.01); *B01D 53/18* (2013.01); *B01D 53/78* (2013.01); *F23G 5/50* (2013.01); *F23G 7/06* (2013.01); *B01D 2258/0216* (2013.01); *B01D 2258/0283* (2013.01); *F23M 2900/05001* (2013.01)

(58) Field of Classification Search
USPC ........... 431/5, 346; 423/210, 240 R; 422/117, 422/168, 187
See application file for complete search history.

(56) References Cited

U.S. PATENT DOCUMENTS

| | | | | |
|---|---|---|---|---|
| 3,892,519 | A | * | 7/1975 | Reed et al. ................... 431/202 |
| 4,015,927 | A | * | 4/1977 | Culpepper, Jr. .................. 431/5 |
| 4,152,399 | A | * | 5/1979 | Germerdonk et al. ........ 423/210 |
| 4,973,451 | A | * | 11/1990 | Vickery ........................ 422/110 |
| 7,270,539 | B1 | * | 9/2007 | Sujata .............................. 431/5 |

* cited by examiner

*Primary Examiner* — Timothy Vanoy
(74) *Attorney, Agent, or Firm* — Gard & Kaslow LLP (57) ABSTRACT

Abatement systems are used to remove harmful pollutants resulting from manufacturing processes. Prior art abatement systems can dangerously back-flash due to, for example, changes in gas velocity and if the inlets become constricted due to clogs. To prevent back-flash a sprayer is introduced to an inlet of the abatement system. The sprayer sprays a volume of a cooling liquid, such as water, into the inlet. In the event of a back-flash, the liquid can extinguish the flame, preventing further damage to the abatement system. The sprayed liquid can provide further benefits, such as cooling the incoming, mitigating effects of reactions within the cooling gases, and flushing away solid particles that would otherwise clog the inlet. These further benefits can allow the abatement system to safely handle additional gases and larger volumes of incoming gas.

19 Claims, 5 Drawing Sheets

SYSTEMS AND METHODS TO PREVENT BACK-FLASH IN AN ABATEMENT SYSTEM

PRIORITY CLAIM

This U.S. Non-Provisional Patent Application is a continuation application of U.S. Non-Provisional Patent Application No. 14/213,973 filed Mar. 14, 2014 and entitled "Extended or Multiple Reaction Zones in Scrubbing Apparatus" which claims priority to, and the benefit of, U.S. Provisional Patent Application No. 61/812,206 filed Apr. 15, 2013 and entitled "Wet Wall Burn Technology" both of which are hereby incorporated by reference in their entirety herein.

BACKGROUND

1. Field

This patent application relates generally to control and containment of gases and more specifically to preventing back-flash in a scrubbing apparatus.

2. Description of Related Art

A variety of industrial processes create gas streams that must be scrubbed of contaminants before being released to the outside world. The manufacture of electronics, solar cells, display devices, communications devices, metals, ceramics, and polymers, as well as the processing of chemicals, drugs, and other materials, often requires the use of exhaust gas scrubbers. Scrubbers typically receive a substantially gaseous exhaust stream (sometimes containing fine particles) and remove contaminants from the gas stream before the stream is released to the environment.

Exhaust streams from electronic fabrication processes may include a variety of contaminants, including but not limited to perfluorocarbon (PFC) etch gases such as $SF_6$, $NF_3$, $CF_4$, $C_2F_6$, $C_4F_8$, $COF_2$, and $C_4F_6$. Exhaust streams may include toxic hydrides such as $AsH_3$, $PH_3$, $P_2H_4$, or $B_2H_6$. Exhaust streams may also contain pyrophoric or flammable gases such as $SiH_4$, $H_2$, $Si_2H_6$, $GeH_4$, and gases such as $WF_6$, $SiF_4$, $HCl$, $BCl_3$, $Cl_2$, $TiCl_4$, $F_2$, $HF$, and various chlorosilanes.

Other industrial processes may also create toxic or polluting exhaust streams particular to a material or manufacturing process. Volatile organic compounds (VOCs) may be present in various petroleum refining processes, chemical reaction processes, or other organic synthesis reactors. Room or chamber ventilation (e.g., of a spray painting facility or an environment containing microbes or viruses) may also require exhaust gas scrubbing or the use of other abatement systems.

Many contaminants require specific scrubbing procedures. Contaminants such as $HCl$, $Cl_2$, and $BCl_3$ are often soluble in water, and may often be removed using so-called wet scrubbers. Contaminants such as $SiCl_4$, $SiH_2Cl_2$, $NH_4F$, $WF_6$, $WCl_4$, and $TiCl_4$ (herein "water-reactive" contaminants) may or may not dissolve in water, depending upon various conditions. These contaminants may also react with water to form solid reaction products, which may clog various flow paths.

Another category of contaminants includes "water-insoluble" contaminants such as $SiH_4$, PFCs such as $CF_4$ and $C_2F_6$, $SF_6$, and $NF_3$. Among other deleterious characteristics, many of these contaminants are characterized by a "global warming potential," which may be hundreds or thousands of times stronger than that of $CO_2$ and reflecting a much stronger behavior as a greenhouse gas in the Earth's atmosphere.

Some contaminants are often abated by combusting the contaminant to form water-soluble reaction products that are then removed by wet scrubbing. Sometimes, such combustion requires high temperatures. For example, $NF_3$ may be combusted at temperatures above 900 degrees Celsius; $CF_4$ may be combusted at temperatures over 1200 degrees Celsius. Other contaminants such as $SiH_4$ may sometimes be reacted simply by exposing the contaminant to an oxygen source.

Water-insoluble, thermally decomposed contaminants may form reaction products (e.g., HF) that may be removed by wet scrubbing the reacted gas stream. Other water-insoluble contaminants (e.g., $SiH_4$) may form reaction products that include solid species (e.g., $SiO_2$), when thermally reacted.

Generally, solid species in a waste stream may be present as fine particles liquid phase (e.g., water associated with a scrubber), in the phase, deposited on a solid surface, or in other ways. These solid species may also nucleate directly on various surfaces. While the formation of solid reaction products may enable certain removal methods (e.g., filtration), these species may also deposit on and clog various lines, inlets, passages, surfaces, and other aspects of the system, reducing the system's efficiency or stopping its operation.

Previous designs used separate process chamber inlets organized such that the mixing of reactive gases occurs at or very near the thermal abatement zone. This prevents the reactive gases from combining and reacting outside of the thermal abatement zone in a reaction chamber.

Thermally decomposing noxious or flammable gases can pose flammability or explosion hazards. The flame front within a reaction chamber can propagate upstream into chambers that are not built to contain the pressures of an explosion or into materials that are not suitable for contact with high temperatures or flames. If the velocity of the flame front is greater than the velocity of the gas entering the apparatus, the flame migrates upstream. This can burn interior surfaces of plumbing or devices or cause an explosion. To combat this phenomenon, prior designs have used constricted inlets. By inserting one or multiple constrictions in the incoming flow stream, the velocity of the gas is increased through the constriction to the point where the flame front cannot migrate upstream. If the constriction is of fixed impedance and the flow increases above the calculated range of operation, higher pressure results upstream of the inlet. If the flow decreases to where the flame front velocity is greater than the flow velocity, the flame will migrate upstream through the constriction and thereby causing a hazard. With a variable constriction, these issues can be overcome; however, control and monitoring systems are complicated and subject to failure and thus are not safe. Another prior device is a backflash arrestor. This device may consist of a metal mesh or baffle installed in the inlet pipe. As the flame propagates upstream it encounters the mesh or baffle whereby it is cooled to below the flammable temperature limit and extinguished. However, such devices are prone to clogging and corroding requiring excessive maintenance.

SUMMARY

An example embodiment of an abatement system comprises: a main burner nozzle mounted at a superior end of a reaction chamber; an inlet chamber forming an annulus surrounding the main burner nozzle, the inlet chamber fluidly connected to the reaction chamber to allow liquid and incoming gas to pass from the inlet chamber to the reaction chamber; a first inlet tube having a first end coupled to the inlet chamber at an angle generally tangential the annulus to convey the liquid and the incoming gas to the inlet chamber thereby generating a circular flow of the liquid and incoming gas in the inlet chamber about the annulus, the first inlet tube comprising: a spray nozzle mounted at a second end of the first inlet tube opposite the first end and configured to spray a volume of the liquid into the first inlet tube sufficient to contact an interior circumferential wall of the first inlet tube near the first end of the first inlet tube; and a first feed tube to convey the incoming gas to the first inlet tube, the first feed tube coupled to the first inlet tube between the second end and the interior circumferential wall of the first inlet tube contacted by the sprayed liquid.

An example embodiment of a method of abating contaminants in incoming gas comprises: receiving incoming gas into an inlet tube from a feed tube; spraying, using a spray nozzle mounted at a first end of the inlet tube opposite a second end, a volume of a liquid into the inlet tube sufficient to contact an interior circumferential wall of the inlet tube near the second end of the inlet tube and to mix the incoming gas with the liquid; directing the mixture of the liquid and the incoming gas to flow through the inlet tube into an inlet chamber forming an annulus surrounding a main burner nozzle mounted at a superior end of a reaction chamber, the mixture directed at a generally tangential angle relative to the annulus so as to generate a generally circular flow of the mixture in the inlet chamber thereby separating the mixture of the liquid and the incoming gas so that the liquid flows along a first interior wall of the inlet chamber that forms an outer circumference of the annulus and the incoming gas flows between the liquid and a second interior wall of the inlet chamber that forms an inner circumference of the annulus; passing the separated incoming gas into the reaction chamber; allowing the separated liquid to flow from the first interior wall of the inlet chamber into and along walls of the reaction chamber; receiving fuel and oxidizer into the reaction chamber via the main burner nozzle to maintain a flame in the reaction chamber; and thermally abating, using the flame, contaminants in the incoming gas in the reaction chamber.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

To prevent back-flash from occurring in thermal abatement systems, an un-constricted inlet having a spray nozzle is added. The inlet reduces back-pressure on the incoming process gases, cools the inlet gases and extinguishes any backward travelling flames.

To achieve these effects, the inlet comprises three components: an inlet chamber, a feed tube, and an inlet tube. A spray nozzle sprays water or other liquid into the inlet tube, filling the inlet tube with liquid in the form of droplets. The process gases enter the inlet tube via the feed tube. The process gasses are sprayed and saturated with the liquid. The sprayed liquid cools the process gases and flushes solid reaction products through the inlet chamber, so that the solid reaction products are less likely to clog the inlet. The inlet chamber can form, but not be limited to forming, an annulus surrounding the main burner nozzle of the thermal abatement system. The liquid swirls about the outer wall of the annulus and the gases separate from the liquid by virtue of the swirling motion. The separated gases then pass into the reaction chamber fed by the main burner nozzle, and are thermally abated.

Figure 1:
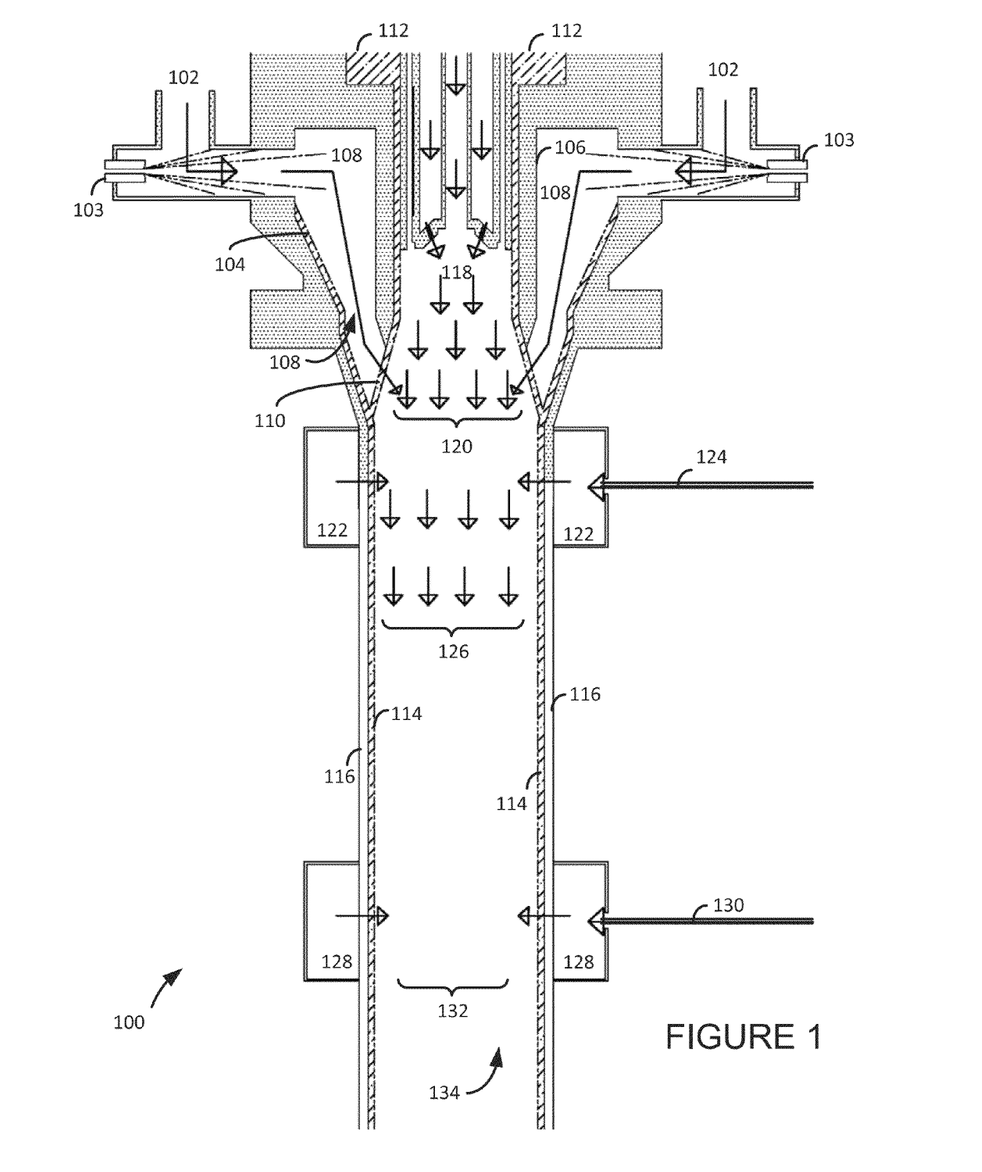
FIG. 1 is an illustration of an embodiment of an abatement system.

FIG. 1 is an illustration of an embodiment of an abatement system 100. The abatement system 100 may be used to react gas or gas streams, and in some cases may be used to react an effluent (or exhaust) gas stream 102 from an industrial process. Select embodiments include various burning apparatus, and may be used to perform combustion reactions. FIG. 1 depicts a cross section of the abatement system 100. Some embodiments of the abatement system 100 may be generally cylindrical, and the various inlets or gas ports may form an annulus about the cylinder.

The abatement system 100 may be used to create a reactive environment to react at least a portion of the gas stream 102 entering at an inlet chamber 108 having an inside formed liquid wall 104 and a wetted center wall 106. The center wall 106 is wetted by spray from nozzles 103. The inlet chamber 108 may, from a top view (shown in FIG. 3), form a fluid-coated annulus about an enclosed vessel 116. At the lower area of the inlet chamber 108, a fluid valve 110 regulates the flow of the gas stream 102 into a reaction chamber 134 of the abatement system 100. One example of such a fluid valve 110 is described in commonly-owned U.S. Pat. No. 7,854,792. The inlet chamber 108 is further described in connection with FIG. 2.

The reaction chamber 134 is defined by virtue of a reservoir 112 that delivers the liquid to the walls of the enclosed vessel 116 to form liquid walls 114. The reservoir 112 contains a flowable liquid for forming the liquid wall such as water, organic liquids, solvents, or other types of liquids. The reservoir 112 may form an annulus about a main burner nozzle 118.

The reservoir 112 receives liquid from a supply line (not shown). The reservoir 112 includes a gap or a valve from which liquid flows out of the reservoir 112 to form the liquid wall 114. The flow rate of liquid into the reaction chamber 134 is such that the liquid substantially coats the inner surface of the enclosed vessel 116 walls after exiting the reservoir 112. The valve or gap may impart a tangential velocity to the liquid contained in the reservoir 112 as it leaves the reservoir 112. In such cases, the liquid wall 114 may "swirl" down the inner surface of the walls of the enclosed vessel 116. The liquid wall 114 defines the reaction chamber 134.

The abatement system 100 is used to form a first reaction zone 120 having first abatement system properties in the reaction chamber 134 to react at least a portion of the incoming gas stream 102. This first reaction zone 120 is generated when a main burner nozzle 118 delivers gases, such as a fuel and an oxidizer, to the upper end of the reaction chamber 134. As depicted, the main burner nozzle 118 may include more than one channel which separate gases can be conveyed to the reaction chamber 134. As is apparent to those skilled in the art and as used herein, the term "gas" can refer to a particular gas or to a mixture of gases. In some instances, the main burner nozzle 118 may receive and convey a reactive gas that reacts with the incoming gas stream 102 at the first reaction zone 120. For example, some concentrations of SiH4 in the incoming gas stream 102 may be reacted by injecting oxygen, air, or other reactive gases into the reaction chamber 134. The main burner nozzle 118 may inject the reactive gas at a range of velocities. Some reactions may use low injection velocities, with which the first reaction zone 120 may be formed proximate to the main burner nozzle 118 (somewhat akin to a "pilot light" on a burner). For some reactions, the gas velocity at the main burner nozzle 118 may be selected so as to cause the first reaction zone 120 to form further from the main burner nozzle 118.

The main burner nozzle 118 may be connected to a gas supply (not shown) which provides various gases to the main burner nozzle 118. In certain embodiments, the gas supply provides methane, hydrogen, propane, natural gas, liquid alkanes, alcohols, or other combustion fuels. The gas supply may also include a source of oxidative gas such as air or oxygen. The abatement system 100 may also include an ignition source, such as a piezoelectric igniter. For incoming gas streams 102 not requiring a heat source (e.g., some gases containing SiH4), the main burner nozzle 118 may provide oxygen without additional fuel. Main burner nozzle 118 may also include an atomizer or piezoelectric injector or other apparatus to inject condensed phases such as liquid fuels into the reaction chamber 134. The main burner nozzle 118 may include low and/or high velocity jets. For incoming gas stream 102 requiring combustion (e.g., some PFCs), the main burner nozzle 118 may be capable of creating a flame within the reaction chamber 134. To create the flame, the main burner nozzle 118 may include a burner, a thermal jet, a plasma generator, or a spark generator.

Downstream of the main burner nozzle 118 and the water valve 110, one or more gas ports (e.g., secondary gas port 122 and tertiary gas port 128) are configured to receive and convey gas into the reaction chamber 134. The gas ports may be connected to the gas supply that provides gas to the main burner nozzle 118 or to one or more separate gas supplies. The gas ports deliver the gas to the reaction chamber 134 so as to create further reaction zones in the reaction chamber 134 downstream of the first reaction zone created by the main burner nozzle 118. As depicted in FIG. 1, the gas ports may convey gas into the reaction chamber 134 at various positions around the cylindrical enclosed vessel 116. In some instances, the gas ports form an annulus positioned around the enclosed vessel 116.

In some instances, a secondary gas port 122 is located just downstream of the water valve 110 to create a second reaction zone 126 downstream from the first reaction zone 120 such that the second reaction zone 126 has second abatement properties. The secondary gas port 122 may receive gas from a gas supply via a secondary supply line 124. The second reaction zone 126 may react the incoming gas stream 102 and the products of the reaction occurring in the first reaction zone 120. In some embodiments, the chemical composition of the gases conveyed to the second reaction zone 126 are different from the chemical composition of the gases conveyed to the first reaction zone 120.

Because the secondary gas port 122, as depicted, is located in proximity to the main burner nozzle 118, the first reaction zone 120 and the second reaction zone 126 may be combined to create an extended reaction zone having the first abatement properties in the reaction chamber 134. The extended reaction zone is created by conveying, to the second reaction zone 126, a gas having the same chemical composition as the gas conveyed by the main burner nozzle 118. For example, if a combustion reaction is created in the first reaction zone, fuels and oxidizers may be conveyed to the reaction chamber 134 by the secondary gas ports 122. The fuel and oxidizers may be provided so as to continue the combustion reaction occurring at the first reaction zone 120 or to change a characteristic of the combustion reaction occurring at the first reaction zone 120. For example, to maintain or extend a combustion reaction occurring in the first reaction zone 120, the secondary gas ports 122 may convey additional oxidizers to the downstream portion of the extended combustion zone.

Because the secondary gas port 122, as depicted, is located in proximity to the main burner nozzle 118, the first reaction zone 120 may be modified to create a combined reaction zone. By diverting some of the gas from the main burner nozzle 118 to the secondary gas port 122, the combined reaction zone can be expanded downstream and outward to radially extend the combined reaction zone to the liquid wall 114. Because the combined reaction zone extends radially from the longitudinal centerline of the reaction chamber 134, the gas stream 102 entering the first reaction zone 120 at the inlet chamber 108 can be more fully exposed to the reactions occurring the combined reaction zone. The radial expansion of the combined reaction zone helps ensure that the effluent gas stream does not bypass the reaction zone. By conveying the gas via the secondary gas port 122, instead of or in addition to conveying the gas via the main burner nozzle 118, the reaction in the first reaction zone 120 occurs more uniformly from the centerline of the reaction chamber 134 to the liquid wall 114. If all of the reaction gas is conveyed via the main burner nozzle 118, most of the reaction activity occurs close to the centerline of the reaction chamber 134 and diminishes outward to the liquid wall 114.

In an alternative embodiment, secondary gas port 122 instead adds to first reaction zone 120 rather creating a second reaction zone 126, by directing gas upwards with sufficient velocity towards first reaction zone 120. This gas may be the same gas provided by the main burner nozzle 118 or may be a different gas to cause some further or additional reaction to occur in first reaction zone 120. Further, depending upon the velocity required, secondary gas port 122 may comprise a tube extending through the liquid wall and pointing upstream, as described elsewhere herein.

Tertiary gas port 128 is positioned further downstream in the reaction chamber 134 than the secondary gas port 122. The tertiary gas port 128 is supplied by a gas supply line 130 and conveys gas to a third reaction zone 132 downstream from the second reaction zone 126 such that the third reaction zone 132 has third abatement system properties in the reaction chamber 134. In some instances, the tertiary gas port 128 may form part of an extended reaction zone with one or more other gas ports (e.g., secondary gas port 122 or further downstream gas ports (not shown)). In other instances, a reaction occurring in the third reaction zone 132 may be distinct from reactions occurring in other portions of the chamber such as reaction zones 120 and 126. The third reaction zone 132 may react still unreacted portions of the gas stream 102 or products of the reactions occurring in the first reaction zone 120, the second reaction zone 126, or the extended reaction zone.

The reaction chamber 134 depicted in FIG. 1 has a secondary gas port 122 and a tertiary as port 128. One of ordinary skill in the art will understand that additional gas ports may be added to the enclosed vessel 116 downstream of the tertiary gas port 128.

The gas conveyed by the gas ports (e.g., the secondary gas port 122 and the tertiary gas port 128) form a multi-zone reaction chamber 134 characterized by having distinct zones in which temperatures and chemical compositions can be maintained or varied allowing sequential chemical reactions to occur. This configuration allows the temperature and chemical composition of each reaction zone to be very different or very similar. Both conditions are possible.

Reaction chambers, such as reaction chamber 134, are fueled by combustible gases such as methane, natural gas, and hydrogen. The combustible gases are oxidized with pure oxygen or air. In a single-zone reaction chamber (not shown), to abate residual gases in the gas stream 102 such as NF3, CF4 and hydrogen resulting from semiconductor processes, a single reaction zone is formed by burning methane, natural gas or combustible source gases with an appropriate oxidizer. The residual gases in the gas stream 102 created by, for example, a semiconductor manufacturing process, are introduced into the single reaction zone via the inlet where the residual gases react. In a single-zone reaction chamber, an operator can vary the flow of combustible gases and oxidizers to vary temperatures and residence times of the residual gases in the single reaction zone to abate the residual gases. Keeping the resident time constant, a higher level of abatement can be achieved at a higher flame temperature. However, the higher flame temperature generates more unwanted reactants, such as NOx. Therefore, it is very difficult to achieve high abatement system efficiency without generating a large amount of unwanted reactants in the single-zone reaction chamber.

A multi-zone reaction chamber 134 has more than one reaction zone. The number of zones in a multi-zone reaction chamber 134 is determined according to the requirements for the abatement system 100 to react the incoming gas stream 102. In the first reaction zone 120, a fuel is conveyed with oxygen or air such that an appropriate high gas temperature is attained at the first zone 120 to achieve a high level of abatement without excess oxygen being presented at the next zone (e.g., second reaction zone 126). This hot gas will be moved to the second reaction zone 126 where remaining residual gases in the gas stream 102, such as NF3, are reacted. Since there is no excess oxygen at the second reaction zone 126, the residual gas is abated without generating undesirable $NO_x$ gas excessively even though the destruction of the residual gas produces N2 gas when the flame temperature is high. The residual methane or natural gas and hydrogen are consumed in a third reaction zone 132 and fourth reaction zone (not shown) downstream by injecting additional oxidizer in the form of oxygen or air. It is desirable to keep the flame temperature lower in the third reaction zone 132 and the fourth reaction zone to mitigate nitrous oxides forming. The low flame temperature in these zones can be controlled by adjusting a rate of injection of the oxidizers. However, some oxidizers such as air comprise significant amount of nitrogen. When large quantities of nitrogen are conveyed to the reaction zones (e.g., first reaction zone 120, second reaction zone 126, or third reaction zone 132), the large volume of nitrogen is heated. Since a fixed amount of heat is released at a given flow rate of fuel, air (approximately 78% nitrogen) can be used to control the temperature of the reaction zone(s). For example, when fluorocarbon gases are abated in the first reaction zone 120, and air is injected into the second reaction zone 126, the first reaction zone 120 is hot enough to decompose the fluorocarbons and the second reaction zone 126 has enough oxygen to burn the hydrogen below safe limits. The excess nitrogen cools the reactor temperature and thereby reduces the amount of harmful oxides of nitrogen formed. Varying amounts of hydrogen in the effluent gas stream requiring abatement are not typically monitored but still require adequate oxygen to react. By injecting air into the second reaction zone 126, enough oxygen is provided to react the highest volumetric level of hydrogen in the effluent gas stream while allowing the first reaction zone 120 to have adequate temperatures to decompose fluorocarbon gases using a reduced amount of fuel. By injecting air in downstream reaction zones, reaction temperatures can be controlled. Controlling the reaction temperatures, in turn, reduces oxide of nitrogen formation and increases the abatement of target gases while reducing the cost of operation of the abatement system 100.

In another example, when the abatement system 100 of the residual gases, such as hydrogen and Silane, do not require a high burning temperature, they can be abated economically by sustaining a low flame temperature. As the hydrogen or Silane flows into the low temperature flame at the second reaction zone 126, air can be fed into the third reaction zones 132 and the fourth reaction zone to burn these residual gases at low burn temperature.

When the residual gases at the second reaction zone 126 contain hydrogen as well as other gases like NF3, the flame temperature at the second reaction zone 126 stays high with minimum oxygen so that NF3 can be abated effectively and the residual hydrogen can be burned economically at the third reaction zone 132 and the fourth reaction zone with air at lower burn temperatures.

In another example, the abatement system 100, when abating some residual gases, can produce excessive amounts of nitrous oxides. By controlling the temperatures in downstream zones (such as the third reaction zone 132 and a fourth reaction zone (not shown)) to between 500 and 850° C., ammonia can be injected into those zones to decompose nitrous oxides.

From the above examples, it would be apparent to one skilled in the art that a multitude of chemistries and temperature conditions can be attained by using a multiple zone technique in the reaction chamber 134. By creating an initial flame with fuels and oxidizers, then injecting gases downstream in the process, chemical compositions as well as temperatures can be varied. As illustrated in the example of reducing nitrous oxide, by using multi-zone chemistries, unwanted reactants can be mitigated. It would be further apparent to one of skill in the art that the use of a multi-zone reaction chamber 134 can be used to control whether a certain reaction occurs. By eliminating the occurrence of the certain reaction, a specific chemical can remain unreacted. Instead of being reacted, the specific chemical can be diluted to a safe level.

Figure 2:
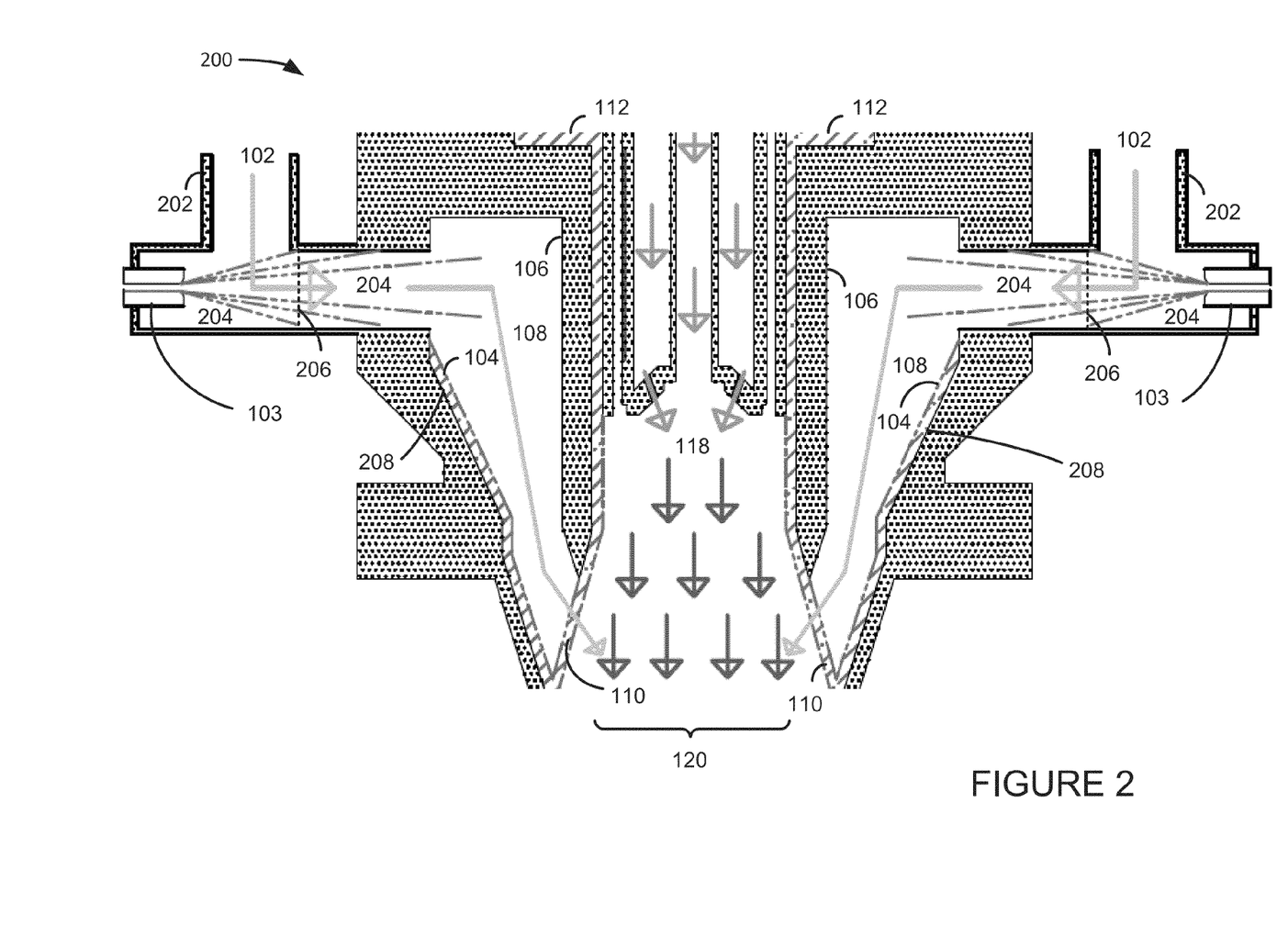
FIG. 2 depicts an example inlet portion of the abatement system.

FIG. 2 depicts an example inlet portion 200 of the abatement system 100 of FIG. 1. The example inlet portion 200 receives the incoming gases 102 and delivers them to the first reaction zone 120. The inlet portion 200 is positioned around the main burner nozzle 118 at the superior end of the reaction chamber 134.

The incoming gases 102 are received into an inlet tube 204 from a feed tube 202. The feed tube 202 is connected to the inlet tube 204 along the length of the inlet tube 204. As depicted, the opening of the feed tube 202 is perpendicular to the inlet tube 204 but can be positioned at another angle relative to the inlet tube 204. In other embodiments, the inlet tube 204 can receive incoming gases from more than one feed tube 202. The additional feed tubes can be positioned about the circumference of the inlet tube 204 or can be aligned with the feed tube 202 along the length of the inlet tube 204.

The spray nozzle 103 is mounted at one end of the inlet tube 204, positioned further from the main burner nozzle 118 relative to the other end of the inlet tube 204. In some instances, the spray nozzle 103 forms an Eductor. The inlet tube 204 is defined by an interior circumferential wall. The spray nozzle 103 sprays a volume of liquid droplets into the inlet tube 204 sufficient to contact the interior circumferential wall near the other end of the inlet tube 204. The volume of liquid droplets can fill the inlet tube 204. In some instances, the spray nozzle 103 has a spray pattern with a spray angle sufficient to impinge completely around the interior circumferential wall of the tube 204, at, for example, a location 206 depicted as a dotted line. The location 206 is a circumference of the inlet tube 204 located between the inlet chamber 108 and the feed tube 202. The location 206 is the location in the inlet tube 204 where the liquid droplets are sprayed but need not be a physical characteristic of the inlet tube 204.

The incoming gas 102 mixes with the sprayed liquid droplets in the inlet tube 204. The incoming gas 102 can react before it is sprayed or with the sprayed liquid droplets. It can be desirable to prevent the incoming gas 102 from reacting before reaching the reaction chamber 134, where it is thermally abated. Reactions within the incoming gas 102 can generate heat, cause pressure to spike, or create solid particles that can clog the inlet tube 204 or the inlet chamber 108. The spray provided by the spray nozzle 103 can prevent these reactions from occurring or mitigate the effects of the reactions by cooling the incoming gas, reducing back pressure in the inlet chamber, and flushing away solid particles. The sprayed liquid further mitigates potential clogs by wetting the walls of the inlet tube 204 and the inlet chamber 108.

For example, incoming Silane can react with incoming oxygen to form water and silicon dioxide (sand). The sprayed liquid cools heat generated by the reaction, and then washes away the solid particles of silicon dioxide, preventing clogs from forming. The solid particles and the water can be carried through the inlet chamber 204 and the reaction chamber 134 as part of the formed liquid wall 104 and the liquid wall 114, respectively.

The inlet tube 204 is connected to the inlet chamber 108 so that the mixed sprayed liquid, incoming gas, and solid particles pass into the inlet chamber 108 at a generally tangential angle (i.e., within plus or minus 30 degrees). As discussed in connection with FIG. 3, the inlet chamber 108 can form an annulus surrounding the main burner nozzle 118 and opening into the first reaction zone 120. The reaction chamber 108 has an interior wall 208 that forms an outer circumference of the annulus. At least a portion of the interior wall 208 is conical so that the water swirls downwards into the reaction chamber 134. Because the liquid enters the annulus at a generally tangential angle (i.e., within plus or minus 30 degrees) and is heavier than the incoming gas 102, the liquid swirls along the interior wall 208 and separates from the incoming gas 102.

In a back-flash, a flame migrates from the first reaction zone 120 in the reaction chamber 134 to the inlet chamber 108. The back-flash can occur when an increase in air pressure inside the reaction chamber 130 causes the flame to break through the fluid valve 110. In other instances, if the velocity of the incoming gases in the inlet chamber 108 drops below the velocity of the gases in the reaction chamber, the flame can migrate into the inlet chamber 108. If a flame reaches the inlet chamber 108, the sprayed liquid swirling around the inlet chamber 108 can not only protect the interior wall 208 from the flame but can also extinguish the flame. The sprayed liquid from nozzle 103 further prevents the back-flash from migrating into the inlet tube 204.

The swirling liquid of the formed wall 104 merges with the liquid flowing out of the fluid valve 110 and continues to flow down the walls of the reaction chamber 134.

Figure 3:
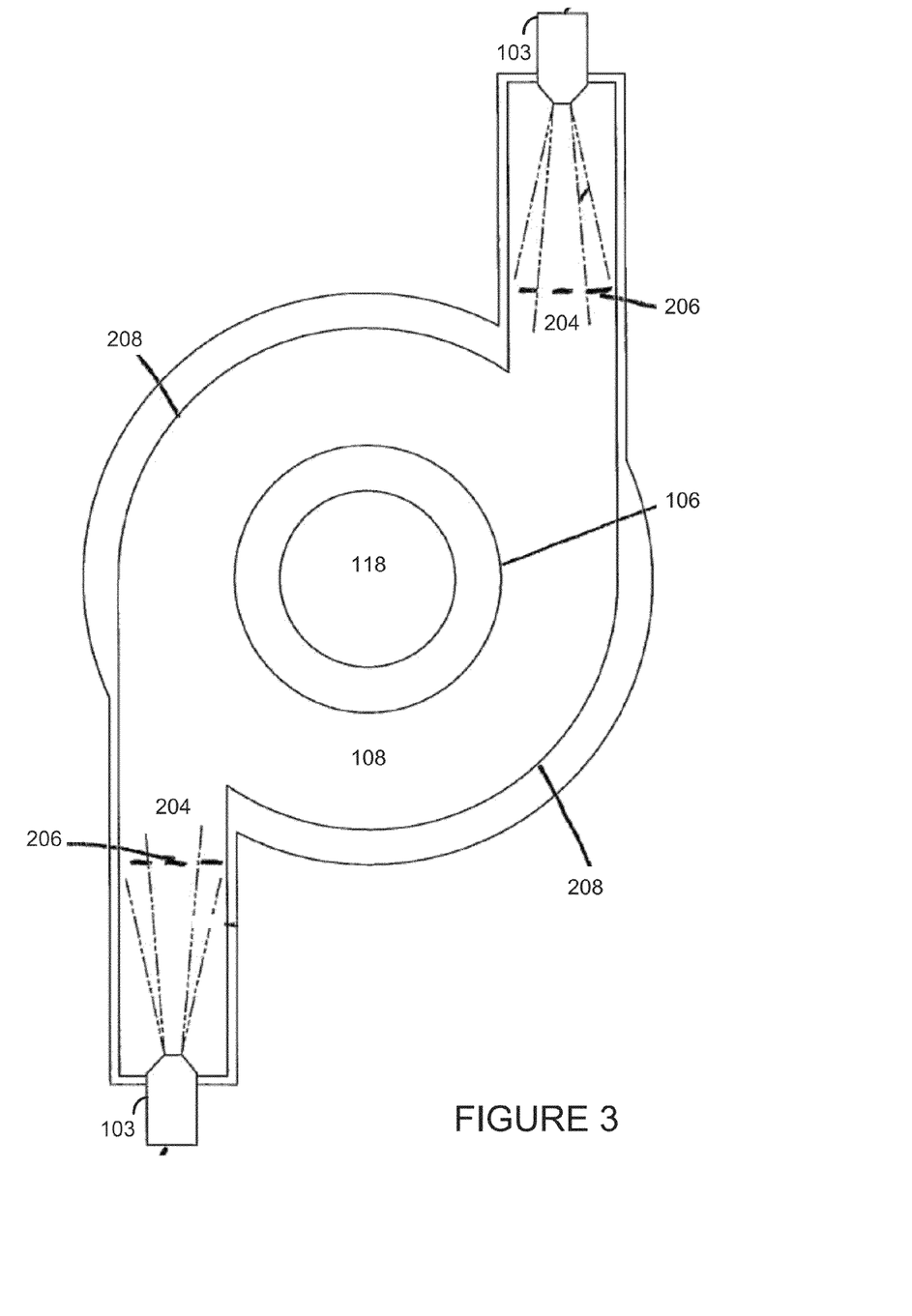
FIG. 3 depicts a top view of the inlet portion of the abatement system.

FIG. 3 depicts a top view of the inlet portion 200 of the abatement system 100. The top view depicts the inlet tube 204, the spray nozzle 103, the inlet chamber 108, and the main burner nozzle 118.

The spray nozzles 103 are respectively positioned at far ends of the inlet tubes 204 connected to the inlet chamber 108. The spray nozzles 103 spray liquid droplets into the inlet tube 204 so that at least a portion of the sprayed liquid contacts a circumferential interior wall at the location 206, depicted as a dotted line. In some instances, the sprayed liquid droplets completely, or nearly completely, fill the inlet tube 204 so that the incoming gases mix with the liquid. To receive the incoming gas 102, one or more feed tubes (not shown in FIG. 3) open along the length of the inlet tube 204 between the spray nozzle 103 and the location 206. As shown, the inlet tubes 204 are located laterally across the inlet chamber 108. The inlet tubes 204 can be laterally positioned relative to one another at other angles.

The inlet chamber 108 forms an annulus, or ring, about the main burner nozzle 118. The center wall 106 separates the main burner nozzle 118 from the inlet chamber 108. The interior wall 208 forms the outer boundary of the inlet chamber 108. The inlet tubes 204 connect to the inlet chamber 108 at the interior wall 208 at an angle that is generally tangential (i.e., plus or minus 30 degrees) to the annulus. The generally tangential angle causes the liquid sprayed by the spray nozzle 103 to flow along the interior wall 208, forming a liquid wall (not shown in FIG. 3, depicted as liquid walls 104 and 114 in FIGS. 1 and 2). A portion of the sprayed liquid can wet the center wall 106, preventing residue from adhering thereto. As depicted in FIG. 2, the interior wall 208 can be at least partially conical so that the liquid, being heavier than the incoming gas, swirls along and coats the interior wall 208. Solid particles, if present, can be flushed by the swirling liquid into the reaction chamber (e.g., reaction chamber 134).

Figure 4:
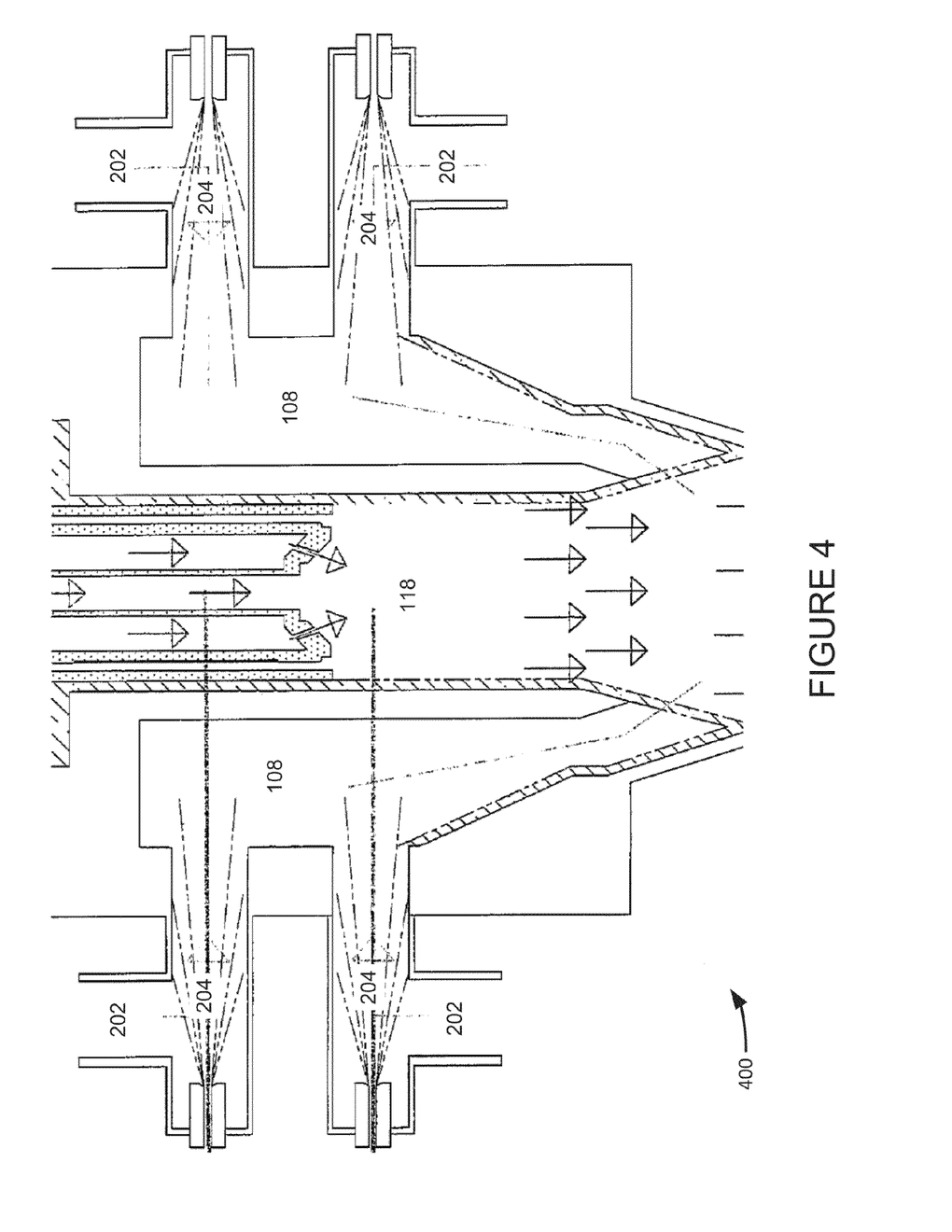
FIG. 4 depicts an example inlet portion of an abatement system according to a further embodiment.

FIG. 4 depicts an example inlet portion 400 of the abatement system 100 according to a further embodiment. The inlet portion 400 is expanded to include four inlet tubes 204 connecting to the inlet chamber 108. Two of the inlet tubes are positioned longitudinally inferior to the other two inlet tubes.

In the embodiment depicted, the inlet tubes 204 receive incoming gas via respective feed tubes 202 that are perpendicular to the inlet tubes 204. In other embodiments, one or more of the feed tubes 202 may be positioned at other angles, such as at right angles crossing the plane of the drawing sheet. Additional feed tubes can be added to the inlet tubes 202.

At least to accommodate the two longitudinally inferior inlet tubes, the inlet chamber 108 and the main burner nozzle 118 can be elongated so that the inlet tubes each connect to the annulus. As discussed above, the sprayed liquid separates from the incoming gas in the inlet chamber 108 before passing through the fluid valve 110 into the reaction chamber 134.

The feed tubes 202 can convey the same gas, or different gases. When the incoming gases are reactive with one another, the inlet portion 400 prevents the reactions from occurring, or, if the gas reacts before entering the reaction chamber 134, mitigates the effects of those reactions (e.g., heat, pressure, and solid particles). Because the effects of these reactions are mitigated, the abatement system 100 can abate a higher volume of incoming gases and gases that were previously abated separately. For gases that were previously abated together but their reactions caused clogs or back-flashes in an inlet portion, the addition of the spray nozzles 103 decreases the amount of system maintenance required.

Figure 5:
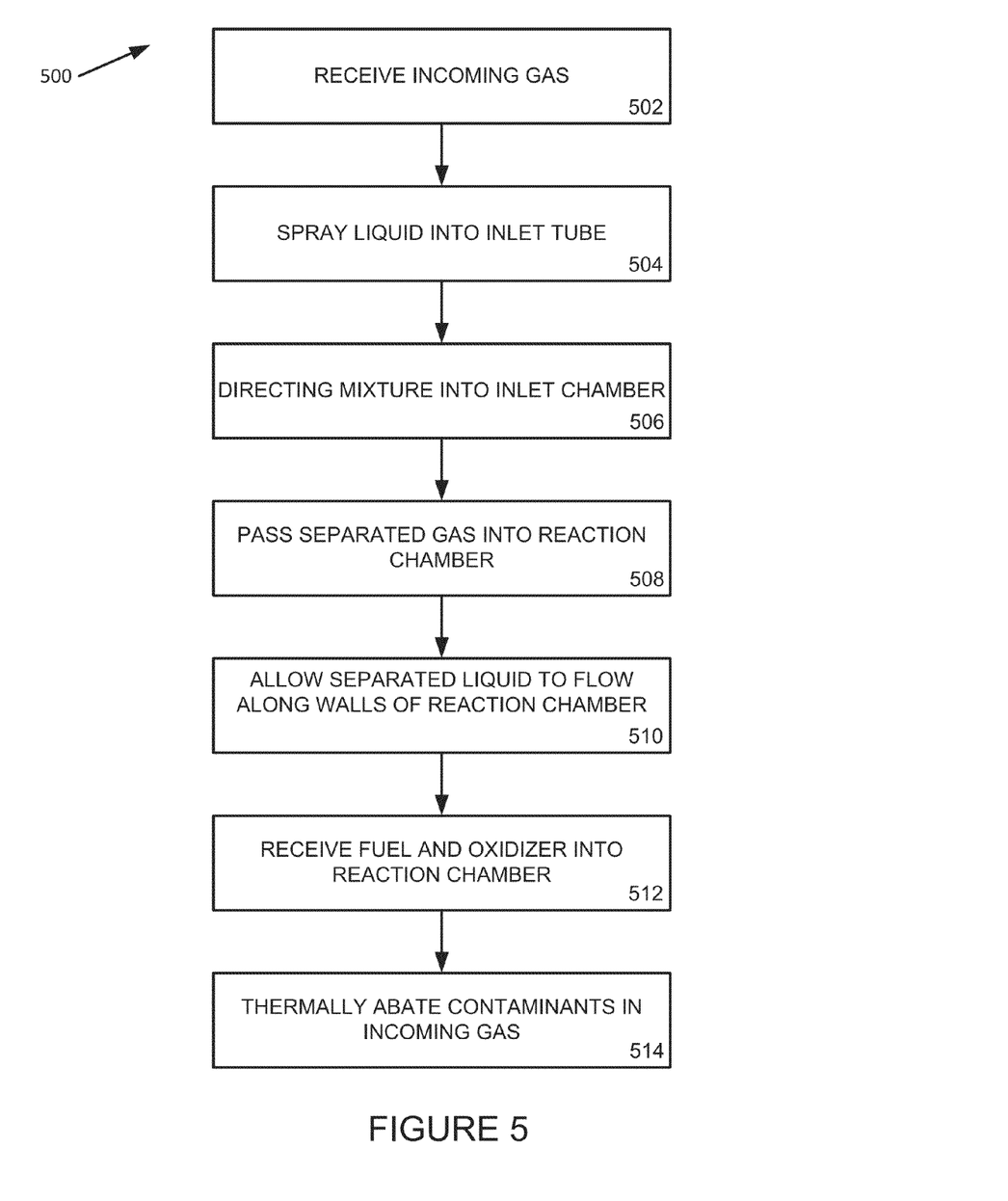
FIG. 5 is a flowchart of a method of preventing back-flash in an abatement system.

FIG. 5 is a flowchart of a method 500 of preventing back flash in an abatement system. The method 500 can be performed by, for example, the abatement system 100. The method 500 may provide additional benefits such as, but not limited to, cooling the incoming gases, reducing the pressure of the incoming gases, preventing clogs within an inlet portion of the abatement system, and eliminating, or mitigating the effects of, reactions occurring in the inlet portion of the abatement system 100.

In an operation 502, incoming gas is received into an inlet tube (e.g., inlet tube 204) from a feed tube (e.g., feed tube 202). The incoming gases can be a single gas or a mixture of gases. The incoming gas could be at a high temperature.

In an operation 504, liquid is sprayed into the inlet tube (e.g., inlet tube 204) using a spray nozzle (e.g., spray nozzle 103). The volume of the sprayed liquid is sufficient to contact an interior circumferential wall of the inlet tube near the connection to the inlet chamber. The liquid can be water or chemical-laden water. By mixing with the incoming gas, the liquid cools the incoming gas in the inlet tube and/or prevents the gas from reacting. The operation 504 can be performed before, or concurrently with, the operation 502.

In an operation 506, the mixture of the liquid and the incoming gas is directed to flow through the inlet tube (e.g., inlet tube 204) into the inlet chamber (e.g., inlet chamber 108). The mixture is directed by, for example, the momentum of the sprayed liquid. As discussed above, the inlet chamber forms an annulus, and the mixture is directed at a generally tangential angle relative to the annulus so as to generate a generally circular flow of the mixture in the inlet chamber. The circular flow causes the mixture of the liquid and the incoming gas to separate such that the liquid flows along the interior wall of the inlet chamber that forms an outer circumference of the annulus (e.g., interior wall 208) and the incoming gas flows between the liquid and the center wall of the inlet chamber that forms an inner circumference of the annulus (e.g., center wall 106).

In an operation 508, the separated incoming gas passes into the reaction chamber (e.g., reaction chamber 134). In some instances, the separated incoming gas passes through a fluid valve e.g. fluid valve 110).

In an operation 510, the separated liquid is allowed to flow from the interior wall (e.g., interior wall 208) of the inlet chamber (e.g., inlet chamber 108) into and along walls of the reaction chamber (e.g., reaction chamber 134).

In an operation 512, fuel and oxidizer are received into the reaction chamber (e.g., reaction chamber 134) via the main burner nozzle (e.g., main burner nozzle 118) to maintain a flame in the reaction chamber if a flammable mixture is introduced through the inlet. In some instances, the flame can migrate into the inlet chamber, creating a back-flash which can migrate upstream to and through the inlet tube 204 and feed tube 202. The liquid within the inlet chamber can extinguish the flame in the inlet chamber without extinguishing the flame in the reaction chamber because the liquid separates from the gas before entering the reaction chamber.

In an operation 514, contaminants in the incoming gas are abated using a flame in the reaction chamber (e.g., reaction chamber 134).

By spraying the incoming gases with a liquid in the inlet tube 204 of an abatement system 100, back-flashes into the inlet tube 204 and feed tube 202 can be prevented. The sprayed liquid provides further benefits such as cooling the incoming gas and flushing away solid particles. Upon leaving the inlet tube 204, the separated liquid can then coat and protect the walls of the inlet chamber 108 and the reaction chamber 134.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different structures, perhaps more complex than those described herein, may be used, as well as possibly different types of air scrubbing systems.

In one alternative embodiment, inlet tube 204 is coupled directly to reaction chamber 134 so that gas coming from feed tube 202 passes through inlet tube 204 directly into reaction chamber 134 without going through inlet chamber 108.

Further, it should also be appreciated that the described method and apparatus can be implemented in numerous ways, including as a process, an apparatus, or a system. The methods described herein may be implemented by, for example, a control system having a non-transitory computer-readable memory having instructions embodied thereon for instructing a processor to perform such methods. The instructions can be recorded on a computer readable storage medium such as a hard disk drive, floppy disk, optical disc such as a compact disc (CD) or digital versatile disc (DVD), flash memory, etc., or transmitted over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. An abatement system comprising:
    a main burner nozzle mounted at a superior end of a reaction chamber;
    an inlet chamber forming an annulus surrounding the main burner nozzle, the inlet chamber fluidly connected to the reaction chamber to allow liquid and incoming gas to pass from the inlet chamber to the reaction chamber;
    a first inlet tube having a first end coupled to the inlet chamber at an angle generally tangential to the annulus to convey the liquid and the incoming gas to the inlet chamber thereby generating a circular flow of the liquid and incoming gas in the inlet chamber about the annulus, the first inlet tube comprising:
        a spray nozzle mounted at a second end of the first inlet tube opposite the first end and configured to spray a volume of the liquid into the first inlet tube sufficient to contact an interior circumferential wall of the first inlet tube near the first end of the first inlet tube; and
    a first feed tube to convey the incoming gas to the first inlet tube, the first feed tube coupled to the first inlet tube between the second end and the interior circumferential wall of the first inlet tube contacted by the sprayed liquid.

2. The system of claim 1, wherein the first feed tube is positioned perpendicular to the first inlet tube.

3. The system of claim 1, wherein the spray nozzle is configured to spray the volume of the liquid into the first inlet tube sufficient to contact the interior circumferential wall of the first inlet tube by having a spray pattern with a spray angle sufficient to spray completely around the interior circumferential wall of the first inlet tube.

4. The system of claim 1, further comprising a second feed tube to convey additional incoming gas to the first inlet tube, the second feed tube coupled to the first inlet tube between the second end and the interior circumferential wall of the first inlet tube contacted by the sprayed liquid.

5. The system of claim 1, further comprising a second inlet tube having a first end coupled to the inlet chamber at an angle generally tangential to the annulus and located laterally across the inlet chamber from the first inlet tube, the second inlet tube comprising:
a second spray nozzle mounted at a second end of the second inlet tube opposite the first end and configured to spray a second volume of the liquid into the second inlet tube sufficient to contact an interior circumferential wall of the second inlet tube near the first end of the second inlet tube.

6. The system of claim 5, further comprising a second feed tube to convey additional incoming gas to the second inlet tube, the second feed tube coupled to the second inlet tube between the second end and the interior circumferential wall of the second inlet tube contacted by the sprayed second volume of the liquid.

7. The system of claim 1, further comprising a second inlet tube having a first end coupled to the inlet chamber at an angle generally tangential to the annulus and located longitudinally inferior to the first inlet tube, the second inlet tube comprising:
a second spray nozzle mounted at a second end of the second inlet tube opposite the first end and configured to spray a second volume of the liquid into the second inlet tube sufficient to contact an interior circumferential wall of the second inlet tube near the first end of the second inlet tube.

8. The system of claim 7, further comprising a second feed tube to convey additional incoming gas to the second inlet tube, the second feed tube coupled to the second inlet tube between the second end and the interior circumferential wall of the second inlet tube contacted by the sprayed second volume of the liquid.

9. The system of claim 1, further comprising a fluid valve that fluidly connects the inlet chamber to the reaction chamber.

10. The system of claim 1, wherein the liquid comprises water.

11. The system of claim 1, wherein at least a portion of an interior wall of the inlet chamber that forms an outer circumference of the annulus is conical and wherein the circular flow of the liquid and the incoming gas in the inlet chamber causes the liquid to flow along the conical interior wall of the inlet chamber.

12. A method of abating contaminants in incoming gas comprising:
receiving incoming gas into an inlet tube from a feed tube;
spraying, using a spray nozzle mounted at a first end of the inlet tube opposite a second end, a volume of a liquid into the inlet tube sufficient to contact an interior circumferential wall of the inlet tube near the second end of the inlet tube and to mix the incoming gas with the liquid;
directing the mixture of the liquid and the incoming gas to flow through the inlet tube into an inlet chamber forming an annulus surrounding a main burner nozzle mounted at a superior end of a reaction chamber, the mixture directed at a generally tangential angle relative to the annulus so as to generate a generally circular flow of the mixture in the inlet chamber thereby separating the mixture of the liquid and the incoming gas so that the liquid flows along a first interior wall of the inlet chamber that forms an outer circumference of the annulus and the incoming gas flows between the liquid and a second interior wall of the inlet chamber that forms an inner circumference of the annulus;
passing the separated incoming gas into the reaction chamber;
allowing the separated liquid to flow from the first interior wall of the inlet chamber into and along walls of the reaction chamber;
receiving fuel and oxidizer into the reaction chamber via the main burner nozzle to maintain a flame in the reaction chamber; and
thermally abating, using the flame, contaminants in the incoming gas in the reaction chamber.

13. The method of claim 12, further comprising extinguishing, using the liquid, a portion of the flame that has propagated from the reaction chamber into the inlet chamber.

14. The method of claim 12, further comprising cooling the incoming gas in the inlet tube using the sprayed liquid.

15. The method of claim 12, wherein the volume of the liquid sprayed into the inlet tube is sufficient to flush into the reaction chamber solid products of reactions from the incoming gas occurring in the inlet tube.

16. The method of claim 12, wherein passing the separated incoming gas into the reaction chamber comprises passing the separated incoming gas through a fluid valve between the inlet chamber and the reaction chamber.

17. The method of claim 12, wherein the sprayed volume of the liquid into the inlet tube is sufficient to lower a back pressure of the incoming gas in the feed tube.

18. The method of claim 12, wherein the sprayed volume of the liquid into the inlet tube is sufficient to create a negative pressure in the feed tube.

19. An abatement system comprising:
a reaction chamber with a main burner nozzle;
an inlet tube having a first end coupled to the reaction chamber to allow incoming gas to pass from the inlet tube to the reaction chamber, the inlet tube comprising:
a spray nozzle mounted at a second end of the inlet tube opposite the first end and configured to spray a volume of the liquid into the inlet tube sufficient to contact an interior circumferential wall of the inlet tube; and
a feed tube to convey the incoming gas to the inlet tube, the feed tube coupled to the inlet tube between the second end and the interior circumferential wall of the inlet tube contacted by the sprayed liquid.

* * * * *